(12) United States Patent
Cox et al.

(10) Patent No.: US 9,925,736 B2
(45) Date of Patent: Mar. 27, 2018

(54) SANDWICH STRUCTURE

(71) Applicant: CELLTECH METALS INC., San Diego, CA (US)

(72) Inventors: Douglas Cox, San Diego, CA (US); Fabien Ebnöther, Munich (DE)

(73) Assignee: Celltech Metals, Inc., San Diego, CA (US)

( * ) Notice: Subject to any disclaimer, the term of this patent is extended or adjusted under 35 U.S.C. 154(b) by 473 days.

(21) Appl. No.: 14/105,989

(22) Filed: Dec. 13, 2013

(65) Prior Publication Data
US 2015/0165724 A1 Jun. 18, 2015

(51) Int. Cl.
| B32B 3/28 | (2006.01) |
| B21B 1/22 | (2006.01) |
| B21D 39/02 | (2006.01) |
| B32B 5/18 | (2006.01) |
| B32B 15/04 | (2006.01) |

(Continued)

(52) U.S. Cl.
CPC ............... *B32B 3/28* (2013.01); *B21B 1/22* (2013.01); *B21D 39/02* (2013.01); *B32B 3/00* (2013.01); *B32B 3/04* (2013.01); *B32B 3/06* (2013.01); *B32B 3/12* (2013.01); *B32B 3/30* (2013.01); *B32B 5/18* (2013.01); *B32B 7/00* (2013.01); *B32B 7/02* (2013.01); *B32B 7/04* (2013.01); *B32B 7/12* (2013.01); *B32B 15/00* (2013.01); *B32B 15/01* (2013.01); *B32B 15/04* (2013.01); *B32B 15/043* (2013.01); *B32B 15/046* (2013.01); *B32B 15/08* (2013.01); *B32B 27/00* (2013.01); *B32B 27/06* (2013.01); *B32B 27/065* (2013.01); *B32B 27/08* (2013.01); *B32B 37/12* (2013.01); *B32B 38/0012* (2013.01); *B32B 2250/40* (2013.01); *B32B 2419/00* (2013.01); *Y10T 29/49936* (2015.01); *Y10T 156/1002* (2015.01); *Y10T 428/12201* (2015.01); *Y10T 428/24496* (2015.01)

(58) Field of Classification Search
None
See application file for complete search history.

(56) References Cited

U.S. PATENT DOCUMENTS

| 782,558 A | 2/1905 | Hahn |
| 2,087,010 A | 7/1937 | Wardle |

(Continued)

FOREIGN PATENT DOCUMENTS

GB 2182703 A 5/1987

OTHER PUBLICATIONS

Kim, Jang-Kyo, et al.; "Forming and failure behaviour of coated, laminated and sandwiched sheet metals: a review", *Journal of Materials Processing Technology*, 63, 1997, pp. 33-42.

(Continued)

*Primary Examiner* — Adam Krupicka
(74) *Attorney, Agent, or Firm* — Harness, Dickey & Pierce, PLC

(57) ABSTRACT

A sandwich structure employs a core sheet including alternating peaks and valleys therein. In another aspect, a sandwich structure includes at least one metallic core and at least one adhesively bonded outer face sheet. Yet another aspect of a sandwich structure has raised ridges bridging between adjacent peaks in a core sheet in one direction but not in a perpendicular direction, thereby achieving different properties in the different sheet directions.

43 Claims, 15 Drawing Sheets

(51) Int. Cl.

| | | |
|---|---|---|
| *B32B 37/12* | (2006.01) | |
| *B32B 38/00* | (2006.01) | |
| *B32B 7/00* | (2006.01) | |
| *B32B 7/02* | (2006.01) | |
| *B32B 7/04* | (2006.01) | |
| *B32B 7/12* | (2006.01) | |
| *B32B 15/00* | (2006.01) | |
| *B32B 15/01* | (2006.01) | |
| *B32B 15/08* | (2006.01) | |
| *B32B 27/00* | (2006.01) | |
| *B32B 27/06* | (2006.01) | |
| *B32B 27/08* | (2006.01) | |
| *B32B 3/00* | (2006.01) | |
| *B32B 3/04* | (2006.01) | |
| *B32B 3/06* | (2006.01) | |
| *B32B 3/12* | (2006.01) | |
| *B32B 3/30* | (2006.01) | |

(56) References Cited

U.S. PATENT DOCUMENTS

| | | | |
|---|---|---|---|
| 2,391,997 A | 1/1946 | Noble | |
| 2,441,476 A | 5/1948 | Ewald | |
| 2,481,046 A | 9/1949 | Scurlock | |
| 2,738,297 A | 3/1956 | Pfisterhammer | |
| 2,809,908 A | 10/1957 | French | |
| 2,950,788 A | 8/1960 | Edgar | |
| 3,013,641 A | 12/1961 | Compton | |
| 3,071,853 A | 1/1963 | Price et al. | |
| 3,086,899 A | 4/1963 | Smith | |
| 3,151,712 A | 10/1964 | Jackson | |
| 3,173,383 A | 3/1965 | Eggert | |
| 3,217,845 A | 11/1965 | Reynolds | |
| 3,227,598 A | 1/1966 | Robb | |
| 3,432,859 A | 3/1969 | Jordan | |
| 3,481,642 A | 12/1969 | Campbell | |
| 3,525,663 A | 8/1970 | Hale | |
| 3,564,801 A * | 2/1971 | Huerta | E04B 1/54 52/309.11 |
| 3,597,891 A | 8/1971 | Martin | |
| 3,742,663 A | 7/1973 | Duskin | |
| 3,757,559 A * | 9/1973 | Welsh | B21D 5/01 156/198 |
| 3,834,487 A | 9/1974 | Hale | |
| 3,865,679 A | 2/1975 | Hale | |
| 3,876,492 A | 4/1975 | Schott | |
| 3,914,486 A | 10/1975 | Borgford | |
| 3,938,963 A | 2/1976 | Hale | |
| 3,950,259 A | 4/1976 | Pallo et al. | |
| 4,025,996 A | 5/1977 | Saveker | |
| 4,044,186 A | 8/1977 | Stangeland | |
| 4,049,855 A * | 9/1977 | Cogan | B32B 3/12 181/284 |
| 4,077,247 A | 3/1978 | Stewart | |
| 4,275,663 A | 6/1981 | Sivachenko et al. | |
| 4,344,995 A * | 8/1982 | Hammer | B29C 70/08 156/254 |
| 4,356,678 A | 11/1982 | Andrews et al. | |
| 4,411,121 A | 10/1983 | Blacklin et al. | |
| 4,718,214 A | 1/1988 | Waggoner | |
| 4,910,065 A * | 3/1990 | McKinney | B29C 67/0044 156/182 |
| 5,030,488 A | 7/1991 | Sobolev | |
| 5,195,580 A * | 3/1993 | Hoeffken | B21D 39/02 165/170 |
| 5,366,787 A | 11/1994 | Yasui et al. | |
| 5,580,637 A * | 12/1996 | Konta | B32B 5/18 428/137 |
| 5,791,118 A | 8/1998 | Jordan | |
| 6,183,879 B1 | 2/2001 | Deeley | |
| 6,257,043 B1 * | 7/2001 | Wiens | B21D 39/021 29/243.58 |
| 6,547,280 B1 | 4/2003 | Ashmead | |
| 6,846,559 B2 | 1/2005 | Czaplicki et al. | |
| 6,908,143 B2 | 6/2005 | Ashmead | |
| 6,928,848 B2 * | 8/2005 | Golovashchenko | B21D 5/04 29/243.58 |
| 6,939,599 B2 | 9/2005 | Clark | |
| 7,010,897 B1 | 3/2006 | Kuppers | |
| 7,025,408 B2 | 4/2006 | Jones et al. | |
| 7,267,393 B2 | 9/2007 | Booher | |
| 7,401,844 B2 | 7/2008 | Lemmons | |
| 7,648,058 B2 | 1/2010 | Straza | |
| 7,752,729 B2 | 7/2010 | Faehrrolfes et al. | |
| 7,753,254 B2 | 7/2010 | Straza | |
| 7,757,931 B2 | 7/2010 | Straza | |
| 7,927,708 B2 | 4/2011 | Mizrahi | |
| 8,205,642 B2 | 6/2012 | Straza | |
| 8,426,010 B2 | 4/2013 | Stadthagen-Gonzalez | |
| 8,434,472 B2 | 5/2013 | Hanson et al. | |
| 8,580,061 B2 | 11/2013 | Cik | |
| 2005/0029708 A1 | 2/2005 | Coyle | |
| 2005/0084703 A1 * | 4/2005 | Ashmead | E04C 2/32 428/593 |
| 2012/0234470 A1 | 9/2012 | Nishio et al. | |
| 2013/0224419 A1 | 8/2013 | Lee et al. | |

OTHER PUBLICATIONS

Van Straalen, Ijsbrand J.; "Comprehensive Overview of Theories for Sandwich Panels", *TNO Building and Construction Research*, 1998, pp. 48-70.

Stoffer, Harry; "Some suppliers see dollars in a higher CAFE", Automotive News, Crain Communications, Inc., Jul. 2, 2007, two pages.

Carey, John; "What's Next—Green Biz Materials Of New Plastics and a Steel Sandwich", BusinessWeek, Oct. 22, 2007, one page.

". . .Honeycomb Structure Holds Potential", Autotech Daily, Apr. 15, 2008, one page.

Vasilash, Gary S.; "From Small Things: Big Differences", Automotive Design and Production, Jun. 2008, one page.

"UltraSteel" brochure published by Hadley Group in Oct. 2010, 8 pages.

Ebnoether, Fabien, et al.; "Predicting ductile fracture of low carbon steel sheets: Stress-based versus mixed stress/strain-based Mohr-Coulomb model", International Journal of Solids and Structures 50 (2013; published online Dec. 27, 2012); pp. 1055-1066.

Photos of Hyundai "EcoCell" trailer, containing doors including CellTech LLC's three sheet steel sandwich, shown at U.S. tradeshow in Mar. 2013.

"Whiting AirCell Availabity", Whiting airCell promotion, Sep. 26, 2013, three pages.

"airCELL—Innovative Panels for the Truck & Trailer Industries", Whiting, published before Dec. 4, 2013, one page.

"Meyer—Laminating machines for technical textiles, foams, non-woven, foils, fabrics", http.//www.meyer-machines.com/engl/Products/Laminating/laminating.html, printed from internet, believed to have been published prior to Dec. 13, 2013, one page.

"airCELL The revolutionary all-steel sandwich panel that increases strength and reduces weight for trailer side walls and doors", Whiting, published prior to Nov. 2013, four pages.

* cited by examiner

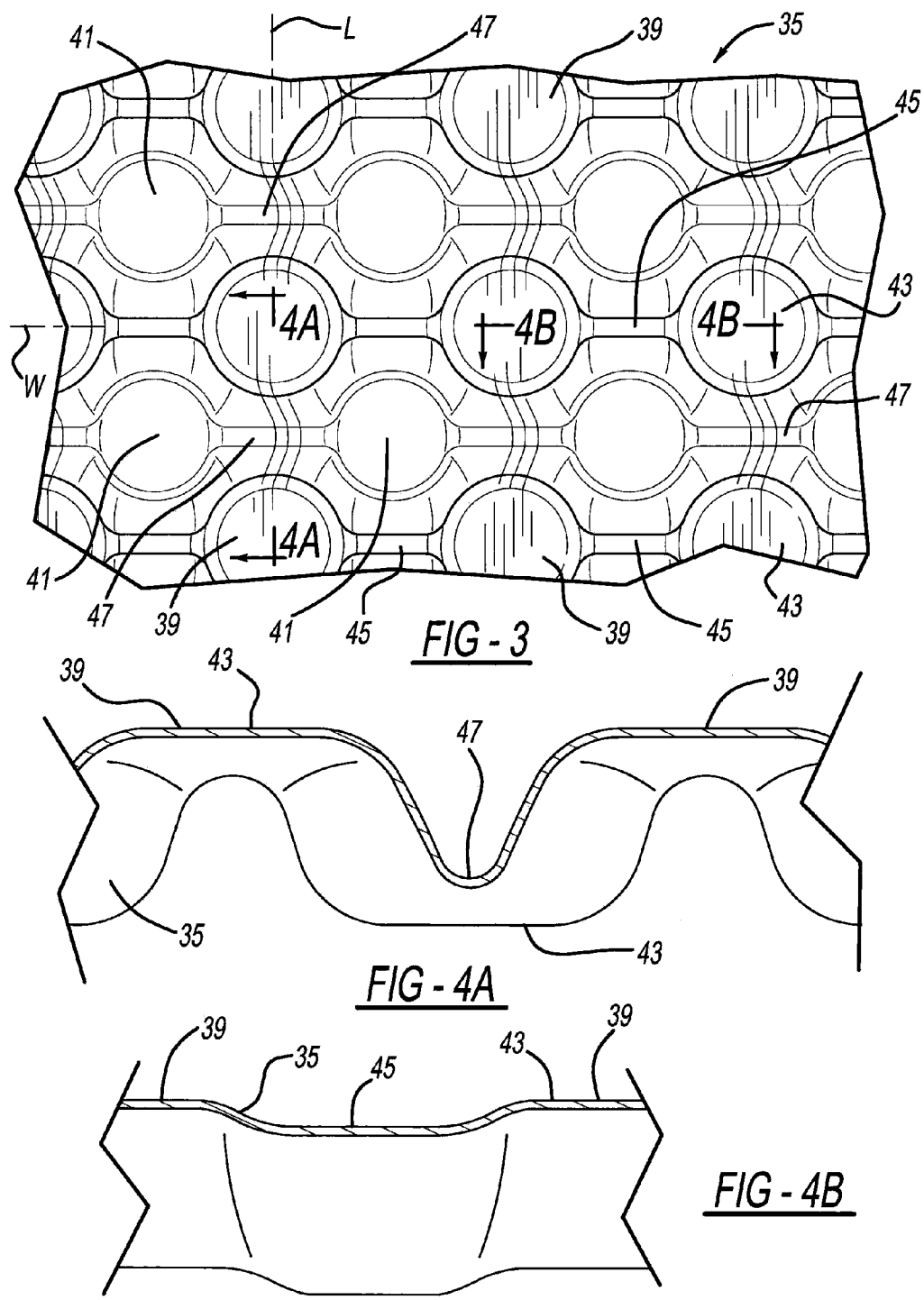

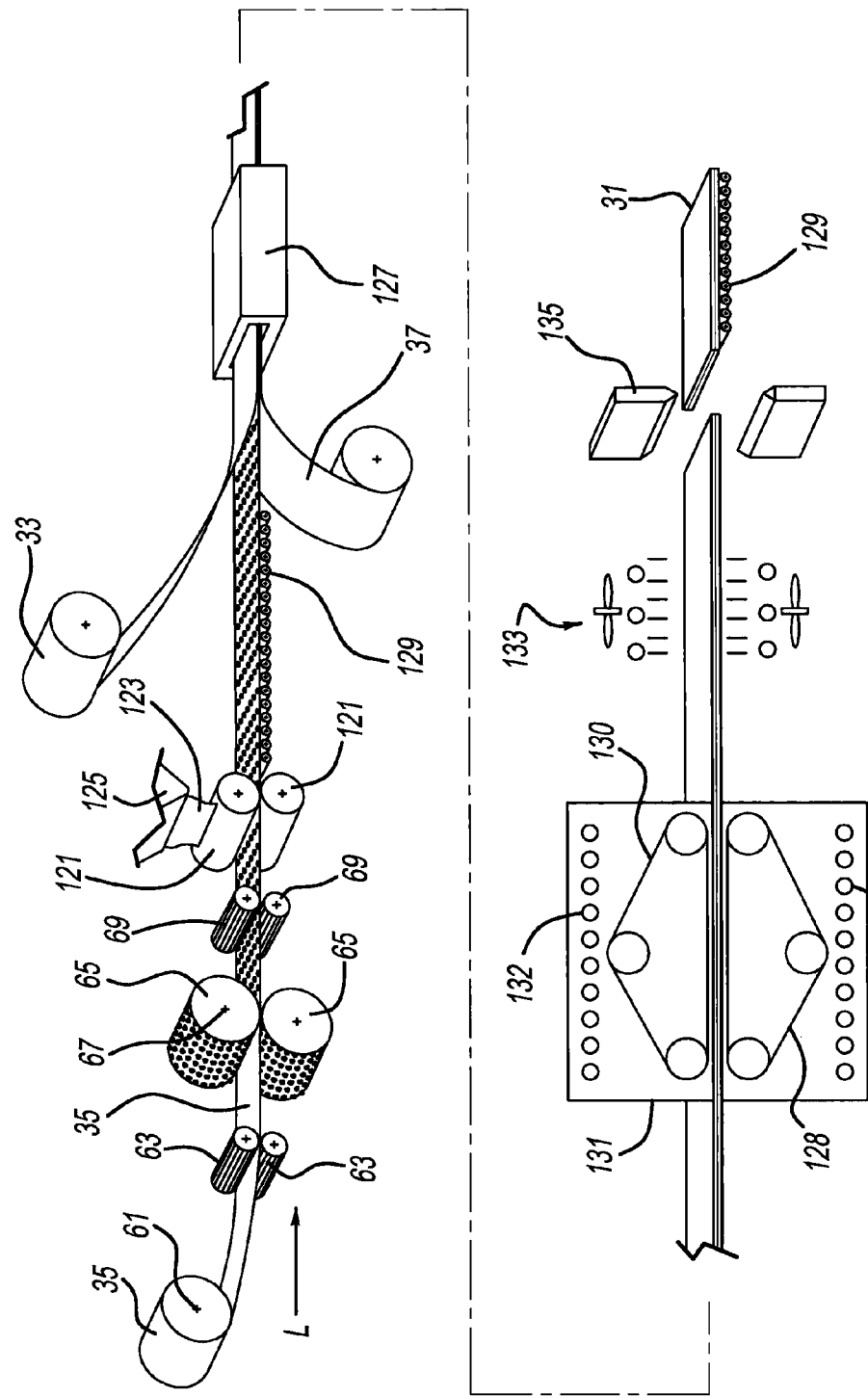

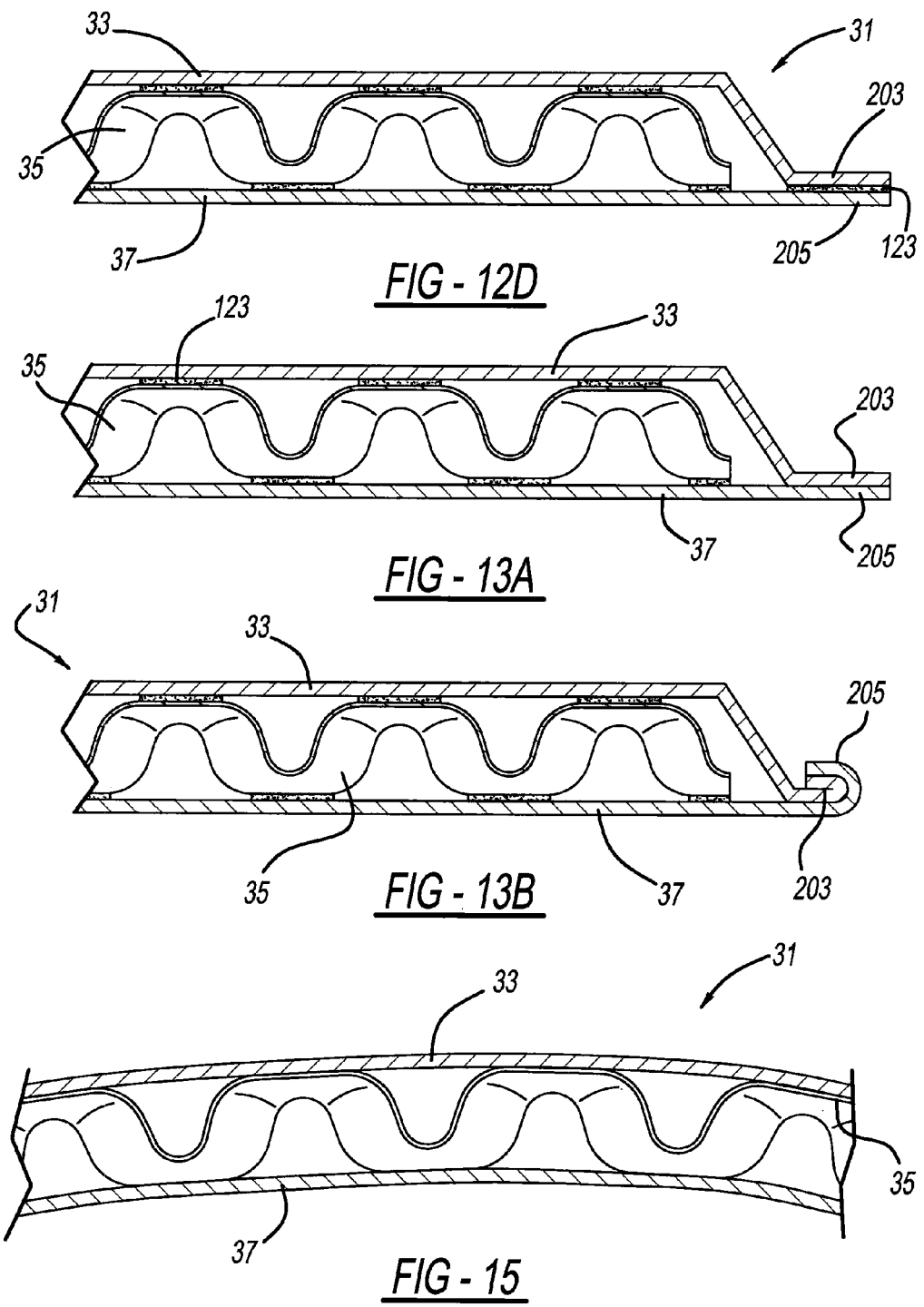

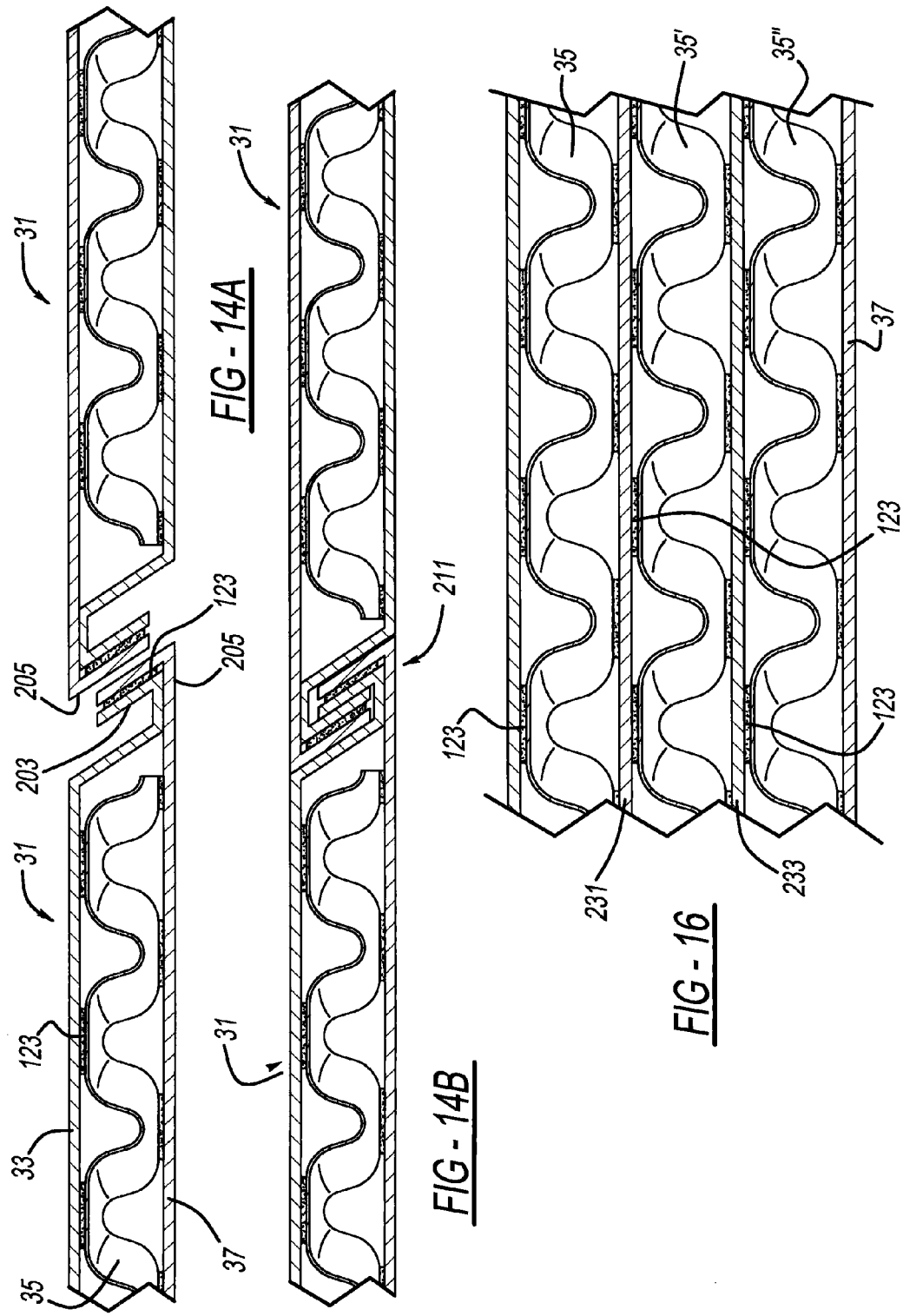

SANDWICH STRUCTURE

BACKGROUND

The present invention relates generally to sandwich structures and more particularly to a sandwich structure including a core having alternating peaks and valleys.

Metallic sandwich structures having outer and core layers are known in the industry. For example, reference is made to the following U.S. Pat. No. 7,752,729 entitled "Method for Shaping a Metallic Flat Material, Method for the Manufacture of a Composite Material and Devices for Performing these Methods" which issued to Faehrrolfes et al. on Jul. 13, 2010; U.S. Pat. No. 7,648,058 entitled "Formed Metal Core Sandwich Structure and Method and System for Making Same" which issued to Straza on Jan. 19, 2010, and is commonly owned herewith; and U.S. Pat. No. 3,525,663 entitled "Anticlastic Cellular Core Structure having Biaxial Rectilinear Truss Patterns" which issued to Hale on Aug. 25, 1970; all of which are incorporated by reference herein. The Hale patent, however, teaches the use of vertically openable stamping dies to form nodes in a heated core sheet, with the objective of obtaining the same flexual and shear strength in all planes. A core stamped in this fashion is prone to tearing during node-forming and the node pattern is symmetrical. Furthermore, the Faehrrolfes patent disadvantageously requires a lubricant during its elongated wave shaping of the core to reducing tearing, which creates later problems with desired adhesive bonding of the outer sheets. It is also noteworthy that Faehrrolfes requires a complex mechanism in order to continuously adjust the forming roll positioning during shaping of each workpiece, which leads to tolerance accuracy concerns and rigidity inconsistencies within a single part as well as part-to-part. The Faehrrolfes wave pattern is also symmetrical in all directions.

SUMMARY

In accordance with the present invention, a sandwich structure employs a core sheet including alternating peaks and valleys therein. In another aspect, a sandwich structure includes at least one metallic core and at least one adhesively bonded outer face sheet. Yet another aspect of a sandwich structure has raised ridges bridging between adjacent peaks in a core sheet in one direction but not in a perpendicular direction, thereby achieving different properties in the different sheet directions. Another aspect employs at least three stacked cores. Moreover, arcuately curved and/or substantially perpendicularly folded exterior surfaces are achieved with a different aspect of the present core and outer sheet structure. Foam is located between a core sheet and an adjacent outer sheet in still another aspect. A further aspect includes a sandwich structure having a peripheral flange which may be hemmed or angularly offset. Additionally, another aspect provides a method of making a core structure including core sheet tensioning during forming, heating after adhesive application and/or pre-cut blank feeding through forming rollers.

The present sandwich structure and method are advantageous over prior constructions. For example, the present sandwich structure and method advantageously do not require a lubricant on the core material for forming of the peaks and valleys therein, thereby allowing an adhesive to be easily applied to the core without requiring removal of the undesired lubricant or an expensive adhesive formulation. Additionally, the present sandwich structure and method allow the peaks and valleys to be formed in the core in a very rapid, repeatable and low cost manner without the tearing concerns of the Hale and Faehrrolfes patents. Moreover, the present sandwich structure and method are advantageously strong and resistant to thickness compression, and also advantageously exhibit asymmetrical flexibility, shear stiffness, shear strength and length shrinkage factor properties, which enhance the sandwich structure product shaping and ease of manufacturing. Generally, perpendicular folding, arcuate curving and foam filling of the present sandwich provide additional strength and product formation benefits not readily achieved with prior devices. Additional advantages and features of the present invention can be ascertained from the following description and appended claims, as well as in the accompanying drawings.

BRIEF DESCRIPTION OF THE FIGURES

FIG. 3 is a true elevational view showing a formed core sheet employed in the sandwich structure;

FIG. 4A is a cross-sectional view, taken along line 4A-4A of FIG. 3, showing the core sheet;

FIG. 4B is a cross-sectional view, taken along line 4B-4B of FIG. 3, showing the core sheet;

FIG. 6A is a diagrammatic view showing a first embodiment manufacturing process for creating the sandwich structure;

FIGS. 12A-12D are a series of cross-sectional views showing the process to make the sandwich structure with an optional peripheral flange;

FIGS. 13A and 13B are a series of cross-sectional views showing the sandwich structure with an optional hem flange;

FIGS. 14A and 14B are a series of cross-sectional views showing the sandwich structure with an interlocking tongue-and-groove flange;

FIG. 15 is a cross-sectional view showing an arcuately curved sandwich structure;

FIG. 16 is a cross-sectional view showing a configuration of a stacked core sandwich structure;

DETAILED DESCRIPTION

Figure 1:
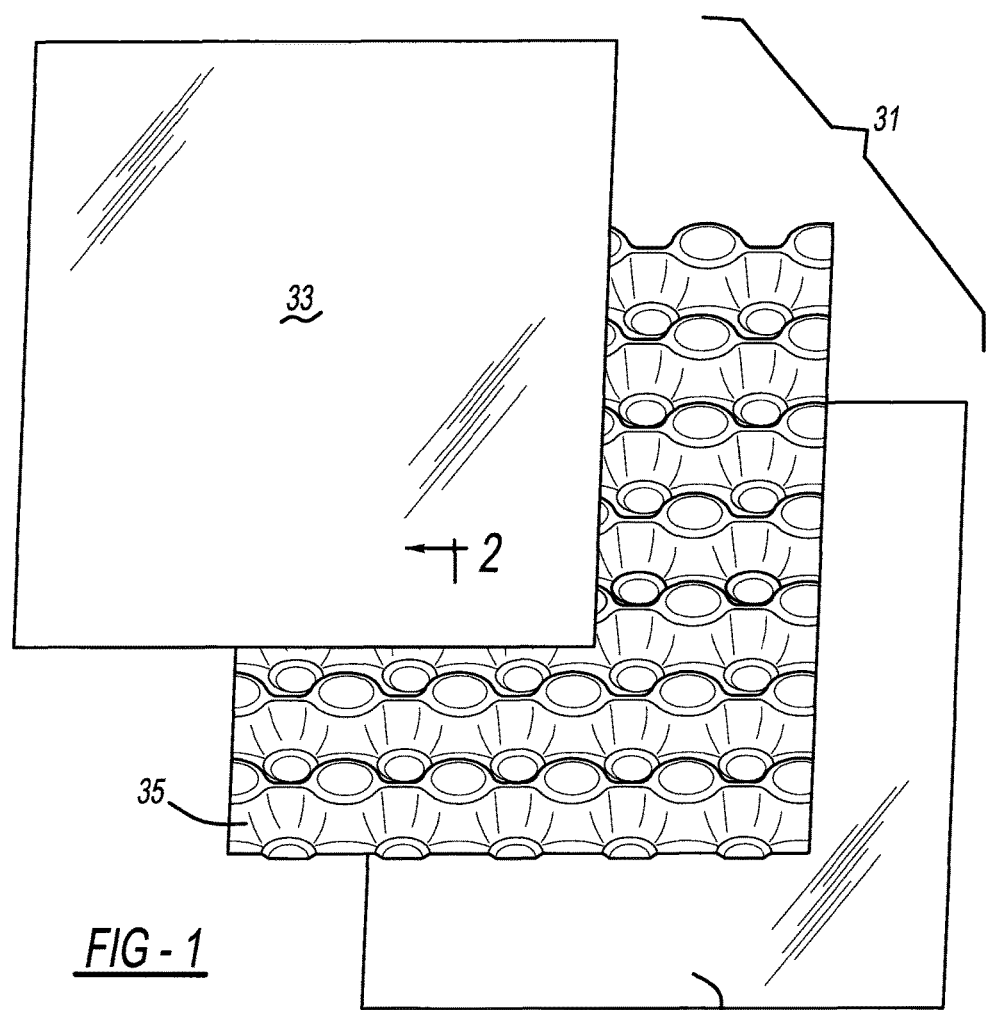
FIG. 1 is an exploded perspective view showing a sandwich structure.
Figure 2:
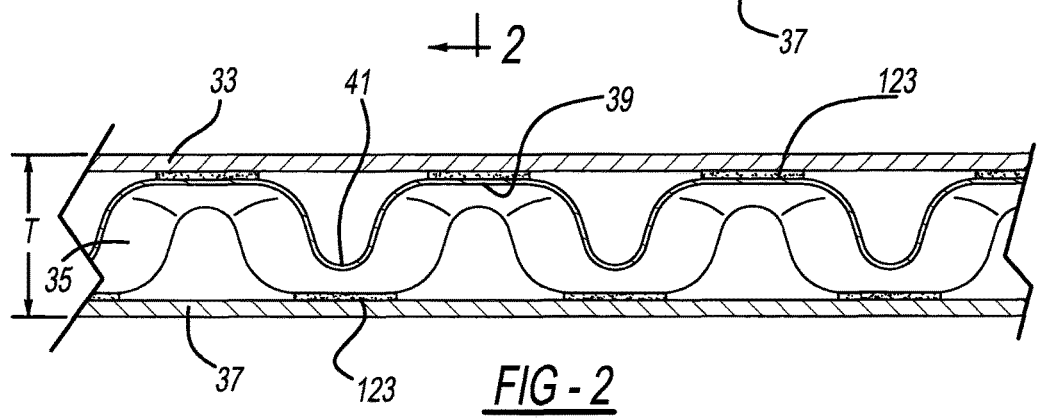
FIG. 2 is a cross-sectional view, taken along line 2-2 of FIG. 1, showing the sandwich structure.

A sandwich structure 31 can be observed in FIGS. 1-4B. Sandwich structure 31 includes a first generally flat, outer face sheet 33, a middle core sheet 35 and an opposite second generally flat, outer face sheet 37. Furthermore, core sheet 35 includes alternating peaks 39 and valleys 41, the external surface of each being defined by a generally flat land 43. Moreover, raised ridges 45 bridge or span between adjacent peaks 39 along a first width direction W but not in the perpendicular length direction L, where a more abrupt and steeply angled depression 47 is formed. Depressions 47 are located between adjacent peaks 39 along second direction L although each depression is elongated parallel to ridges 45 since the depressions are created on the back side of the ridges when the core sheet is formed into the desired contours from an initially flat workpiece sheet. Each ridge 45 is slightly lower than the generally flat lands 43 of the neighboring peaks 39. Sheets 33, 35 and 37 are preferably metallic, such as low carbon steel or aluminum, but any or all of these sheets may alternately be stainless steel or other metallic materials although many of the preferred manufacturing steps and final product properties may be different and less desirable. The metal grain structure is also different in the roll/feeding direction L of core sheet 35 than in the cross-roll/cross-feeding direction W.

The placement of ridges 45 and depressions 47 between the alternating peaks and valleys of core sheet 35 give the core sheet asymmetrical properties or characteristics after and during forming. For example, a length shrinkage factor fs, which is the initial core sheet length versus the formed end sheet length, is at least 1.08, and more preferably at least 1.10 in the roll direction L, as compared to a shrinkage factor fs of approximately 1.0 in the cross-roll/cross-feeding direction W. Furthermore, an out-of-plane shear stiffness of core sheet 35 is at least 1.3 times greater, and more preferably at least 1.4 times greater in the cross-roll/cross-feeding direction W, as compared to the roll/feeding direction L:

$$[L]\text{-}G_{WT}/G_{LT} \geq 1.3$$

Additionally, an out-of-plane shear strength of core sheet 35 is at least 1.05 times greater, and more preferably at least 1.1 times greater in the cross-roll/cross-feeding direction W, as compared to the roll/feeding direction L:

$$[L]\text{-}\tau_{WT}/\tau_{LT} \geq 1.05$$

Figure 5A:
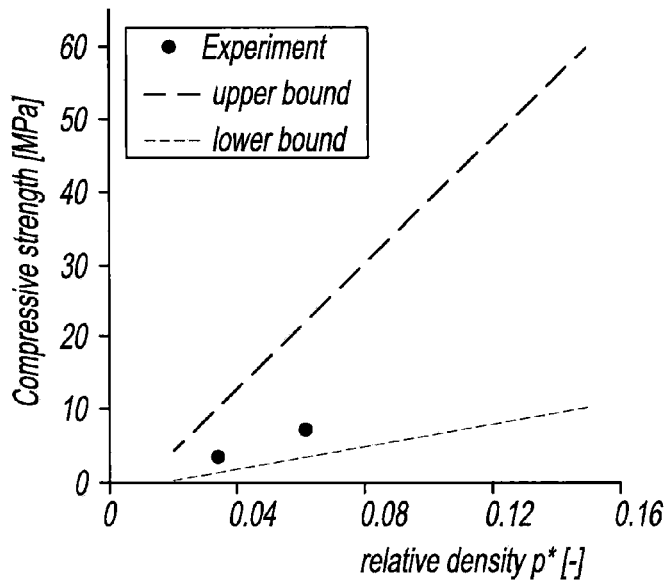
FIGS. 5A and 5B are graphs showing features of the core sheet.
Figure 5B:
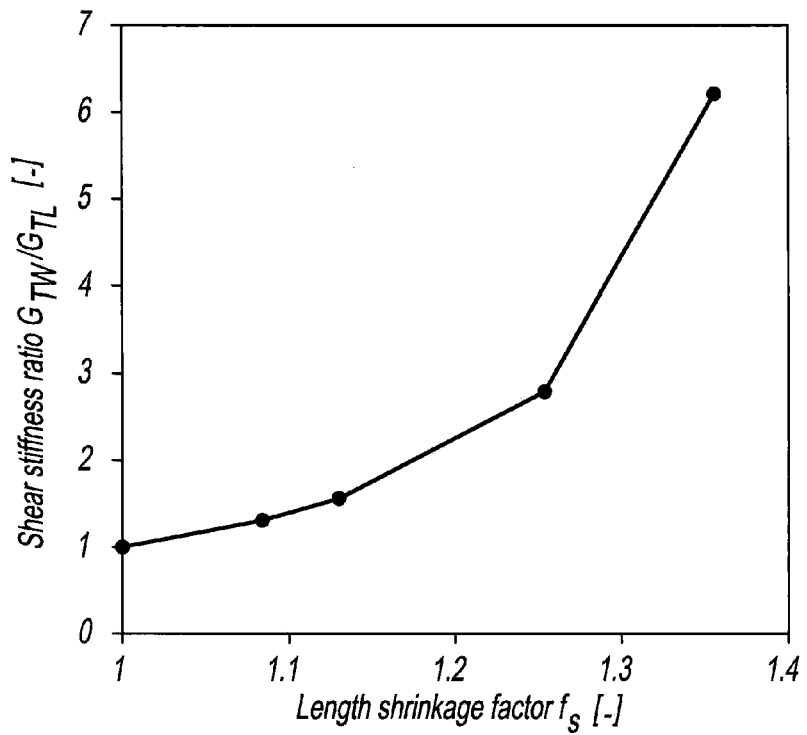

These characteristics are believed to exhibit the data plots shown in the graph of FIG. 5B. In other words, the formed core sheet 35 can be torqued or flexed about an axis parallel to direction W considerably easily than in the perpendicular direction about an axis parallel to direction L due to the ridge and depression orientation and positioning. This can be advantageously employed during the manufacturing and folded part shaping as will be described in greater detail hereinafter. It should be appreciated that the core sheet thickness will vary after it is formed. This asymmetrical core formation is very different than the symmetry desired in prior constructions.

The compressive strength of the present sandwich structure 31, where the outer sheets are bonded to the core sheet, across the cross-sectional thickness (as viewed in FIG. 2) is estimated as shown in the graph of FIG. 5A. The relative density of this particular sandwich core layer can be calculated as followed:

$$\rho^* = \frac{f_S \cdot t_C}{C}$$

where $t_c$ is the initial sheet thickness of the core layer, C denotes the core layer height and $f_s$ is the shrinkage factor in the length direction L. Thus, the asymmetrical nature of the periodic array of peak and valley cells or dimples, as connected in one direction by raised ridges and separated in the other by steep depressions, advantageously provides for different directional forming and final product properties and characteristics.

Figure 6B:
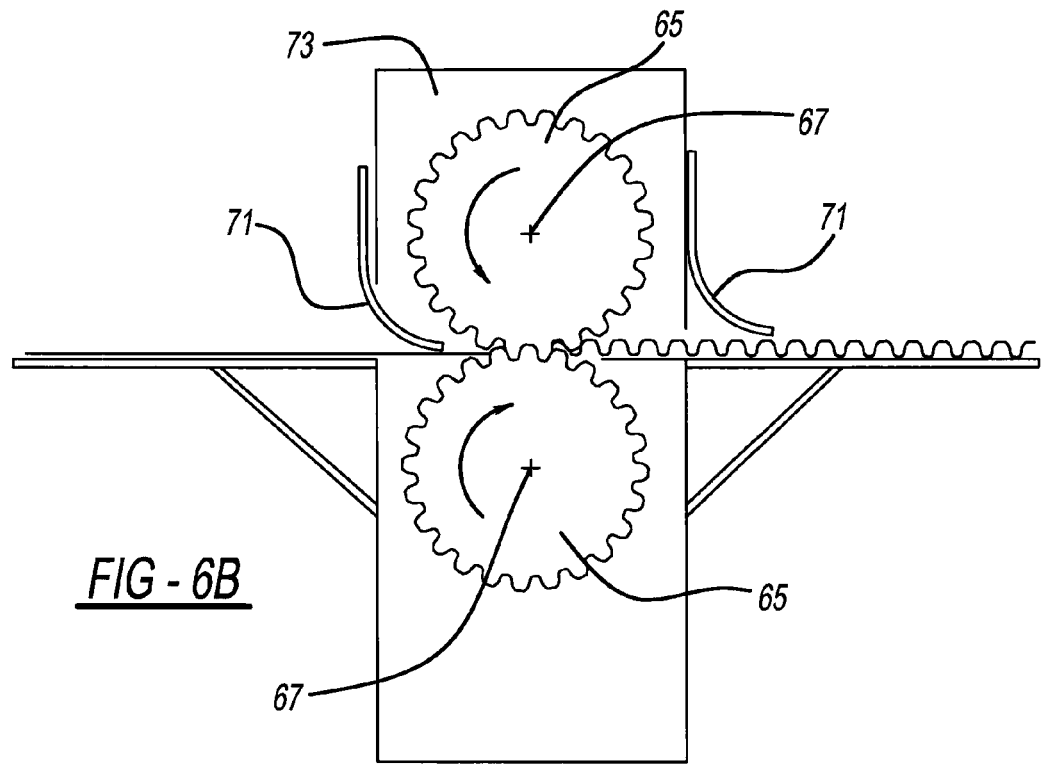
FIGS. 6B and 6C are diagrammatic side views showing different tensioning configurations employed in the manufacturing processes.

FIG. 6A illustrates a first manufacturing process and equipment used to manufacture sandwich structure 31. In this configuration, a coil of elongated core sheet metal 35 rotates about an axis 61 affixed to a support frame or machine for dispensing same. Core sheet 35 is continuously fed along direction L into tensioning pinch rollers 63 and then between a pair of embossing or forming rollers 65 which rotate about their respective axes 67. Axes 67 of embossing rollers 65 are stationarily set at a fixed distance from each other during the complete forming of each core sheet 35 and not adjusted during forming operation. It should be appreciated that one or both of these axes 67 can be moved for maintenance or initial embossing roller setup, however, it is not envisioned that the spacing between embossing rollers 65 change while forming the peaks and valleys of the core sheet, thereby providing tolerance consistence and repeatability within a single part and part-to-part.

Figure 6C:
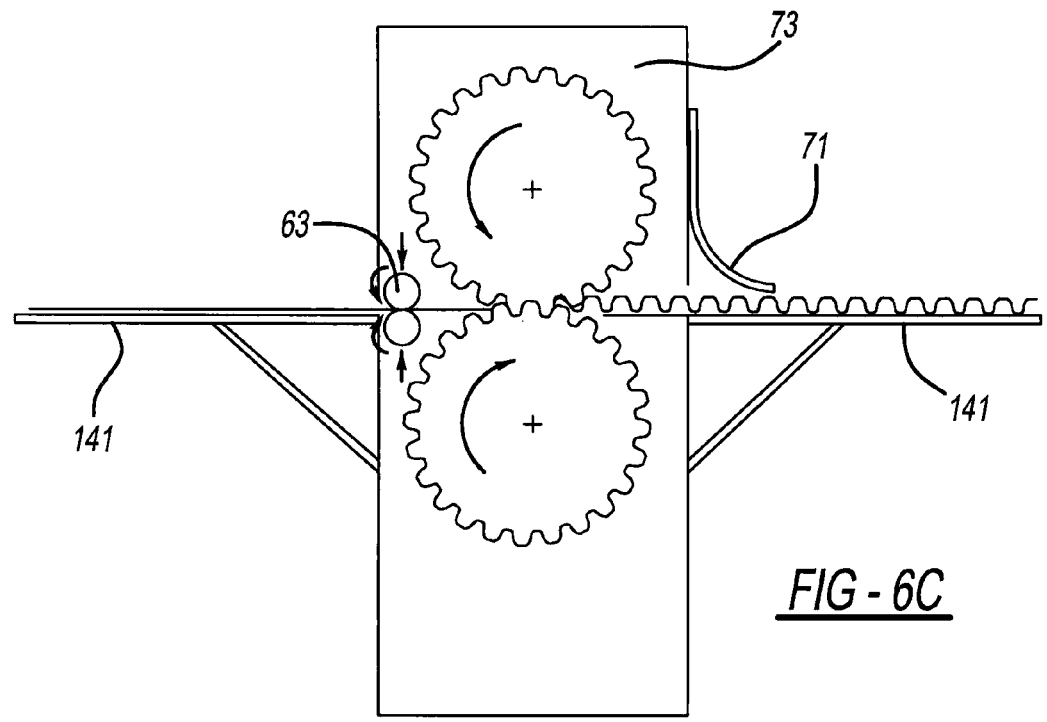
Figure 7:
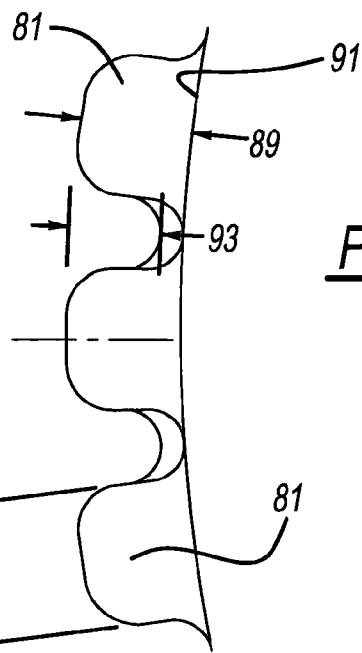
FIG. 7 is an enlarged side elevational view showing pins on an embossing roller employed in the manufacturing processes.
Figure 8:
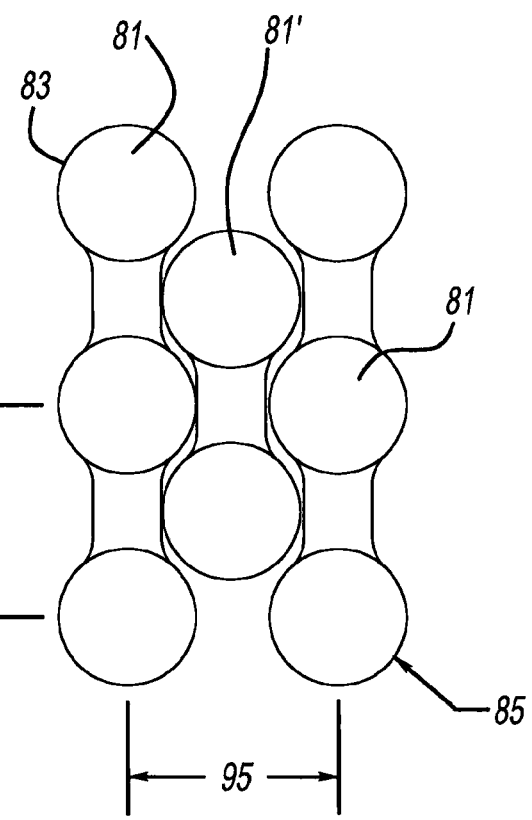
FIG. 8 is a true view showing the pins on the embossing roller of FIG. 7.
Figure 9:
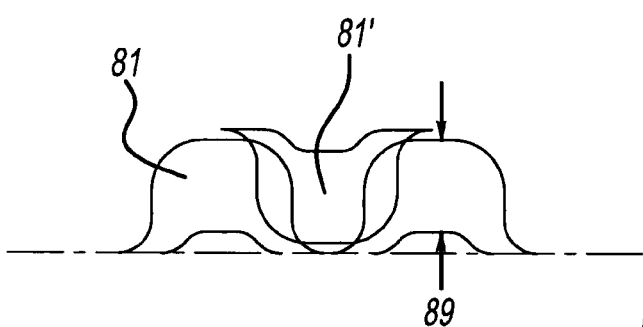
FIG. 9 is a partial front elevational view showing the interrelationship of pins extending from cooperating embossing rollers used in the manufacturing processes.
Figure 10:
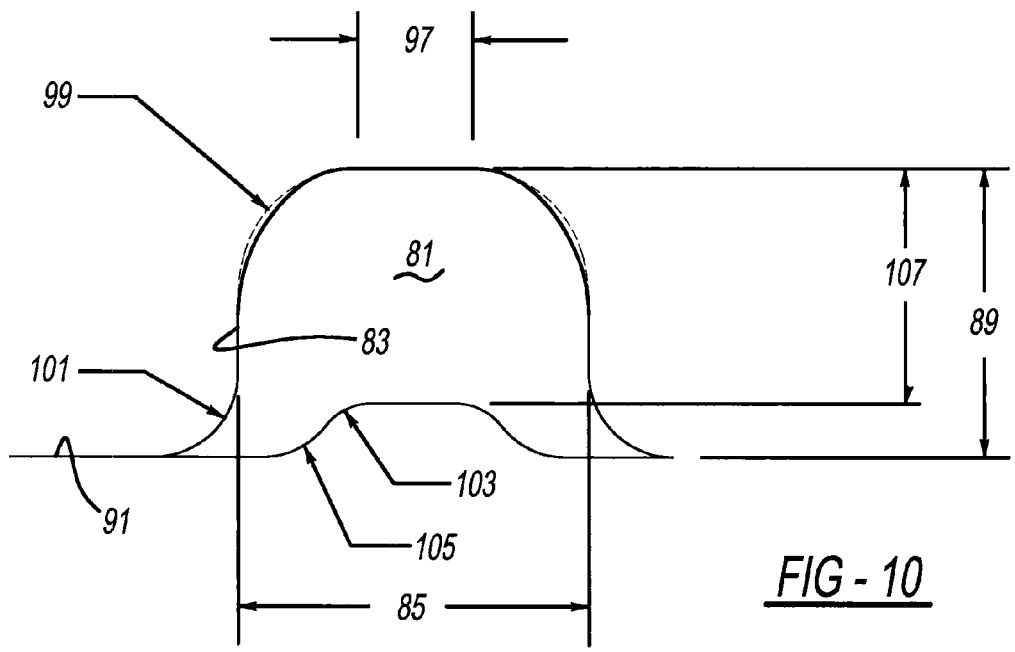
FIG. 10 is an enlarged side elevational view showing one of the embossing roller pins.
Figure 12A:
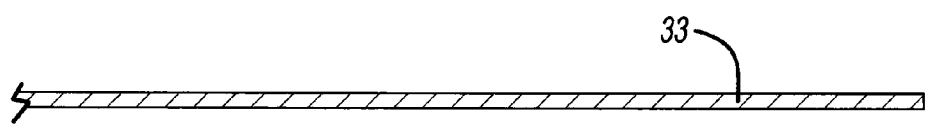
Figure 12B:
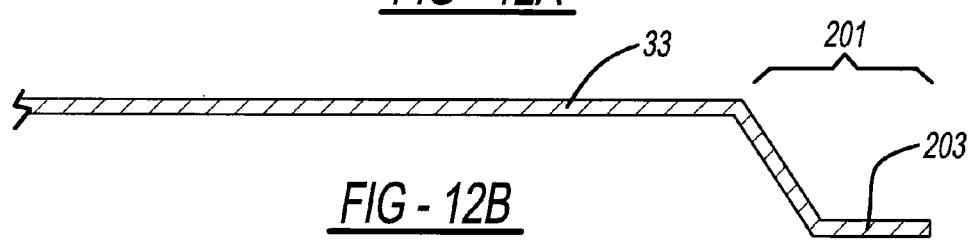
Figure 12C:
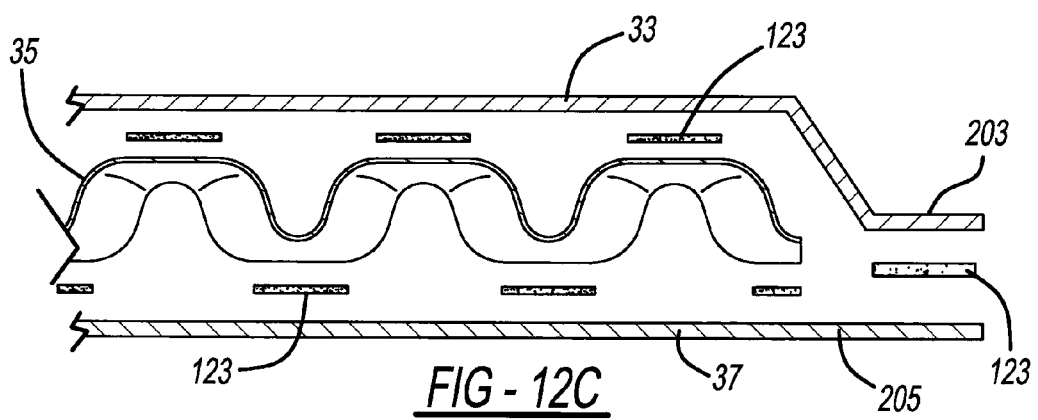

A trailing set of tension pinch rollers 69 are provided downstream of embossing rollers 65. Alternately, "mud-flap-like" pressure arms 71 may flexibly extend from the machine housing 73 before and/or after embossing roller 65 in either of the combinations shown in FIG. 6B or 6C. Each pressure arm 71 may be flexible or rigid with a proximal hinge and biasing spring. Pressure arms 71 and/or tensioning rollers 63 and 69 may be interchanged in order to best provide some tension and friction adjacent upstream and downstream sections of core sheet 35 as the peaks and valleys are being formed therein by embossing rollers 65. It is noteworthy, however, that no lateral or side sheet tensioning is necessary in order to provide the shrinkage factor difference ideally desired to prevent sheet metal tearing during the forming; while side tensioning or clamping may be used, it will not see some of the desired advantages.

The shape of forming pins 81 can best be observed in FIGS. 7-10. Each pin has a generally circular-cylindrical sidewall 83 with a diameter 85 of about 0.668 inch and a center point-to-center point spacing 87 of about 1.0 inch. Furthermore, a total height 89 of each pin is about 0.536 inch away from a circular-cylindrical surface 91 of a drum of each embossing roll 65 (see FIG. 6B). A "free-standing" dimension 93 between a ridge-forming section and a top of adjacent pins is approximately 0.433 inch while a feed direction pin-to-pin center point spacing 95 is about 1.0 inch. A valley forming top flat dimension 97 is approximately 0.220 inch, a distal corner radius 99 is about 0.224 inch, and a lower radius or fillet between a proximal sidewall 83 and a cylindrical drum surface 91 has a radius dimension 101 of approximately 0.157 inch. Moreover, a radius 103 is about 0.118 inch while a reverse radius 105 is about 0.157 inch. Finally, a dimension 107 is approximately 0.433 inch. Accordingly, it can be observed that there are essentially no sharp corners on any portion of each embossing pin 81 or the workpiece contacting area of drum surface 91, while a diameter of each pin is no less than the height of each pin projecting off of the drum for commercial low carbon steel and for aluminum. The pin diameter may be less than the height for a more brittle metal like stainless steel. Nevertheless, the pin diameter should always be greater than the free-standing height 93 for all metal workpiece sheet types to deter tearing. While the exact dimensions may vary depending upon the workpiece material type and sandwich properties desired, the relative dimensional ratios advantageously prevent sheet tearing during manufacturing while also maximizing crush strength and resistance between the peaks and valleys. The embossing rollers are made of tool steel then hardened in order to reduce wear without a need for a workpiece lubricant.

Returning to FIG. 6A, a conveyor 129 moves core sheet 35 into coating rollers 121 which have a curtain of liquid adhesive 123 flowing thereon from feeding hoppers 125 or pipes at an adhesive station. Rollers 121 transport the liquid adhesive onto lands 43 (see FIGS. 3 and 4A) which are essentially the only portions of the core sheet that are adhesively coated, preferably on both sides of the core sheet. Alternately and less preferably, adhesive may be sprayed or brushed onto the lands of the core sheet either in an automated or manually operated manner. It is noteworthy that core sheet 35 is formed and adhesive applied to it at ambient room temperature, humidity and pressure.

Thereafter, coils of generally flat outer face sheets 33 and 37 are continuously fed in direction L and stacked above and below core sheet 35. A preheating oven 127 heats the sheet and more particularly, the adhesive, to a temperature generally between 200-300° F. and more desirably to about 250°. Preheating oven 127 uses top and bottom flames, electrically resistive elements or lights, and is positioned downstream of adhesive coating rollers 121.

A lower vinyl conveyor belt 128 thereafter moves the still continuously elongated but now pre-heated sandwich sheets in a laminating station which includes an upper endless vinyl belt 130 downward applying less than 20 pounds per square foot of pressure, and more preferably about five pounds per square foot of pressure along thickness T. The lamination station is within an insulated box or oven 131 containing at less 10, and more preferably 30, upper tubular bars 132 and the same quantity of lower tubular bars for radiating blown heat therefrom to heat up sheets to a temperature of 350-450° F., and more desirably about 400° F., for 30 seconds or less, and even more preferably 15 seconds or less. This causes very quick initial "green" curing of the bonded sandwich structure 31. Furthermore, belts 128 and 130 each have a feeding length L of at least 10 feet and more preferably at least 30 feet, thereby providing a generally uniform but gentle laminating pressure to one or more elongated sandwich structures therebetween. Subsequently, a fan blows air through liquid transporting chiller or refrigeration tubes in a cooling unit or station 133 downstream of the laminating belts, whereafter, cutting blades 135, water jet cutters, laser cutters or the like are employed to cut the finished and cooled sandwich structure 31 into the desired lengths, which are subsequently packaged and shipped to a customer.

Figure 11:
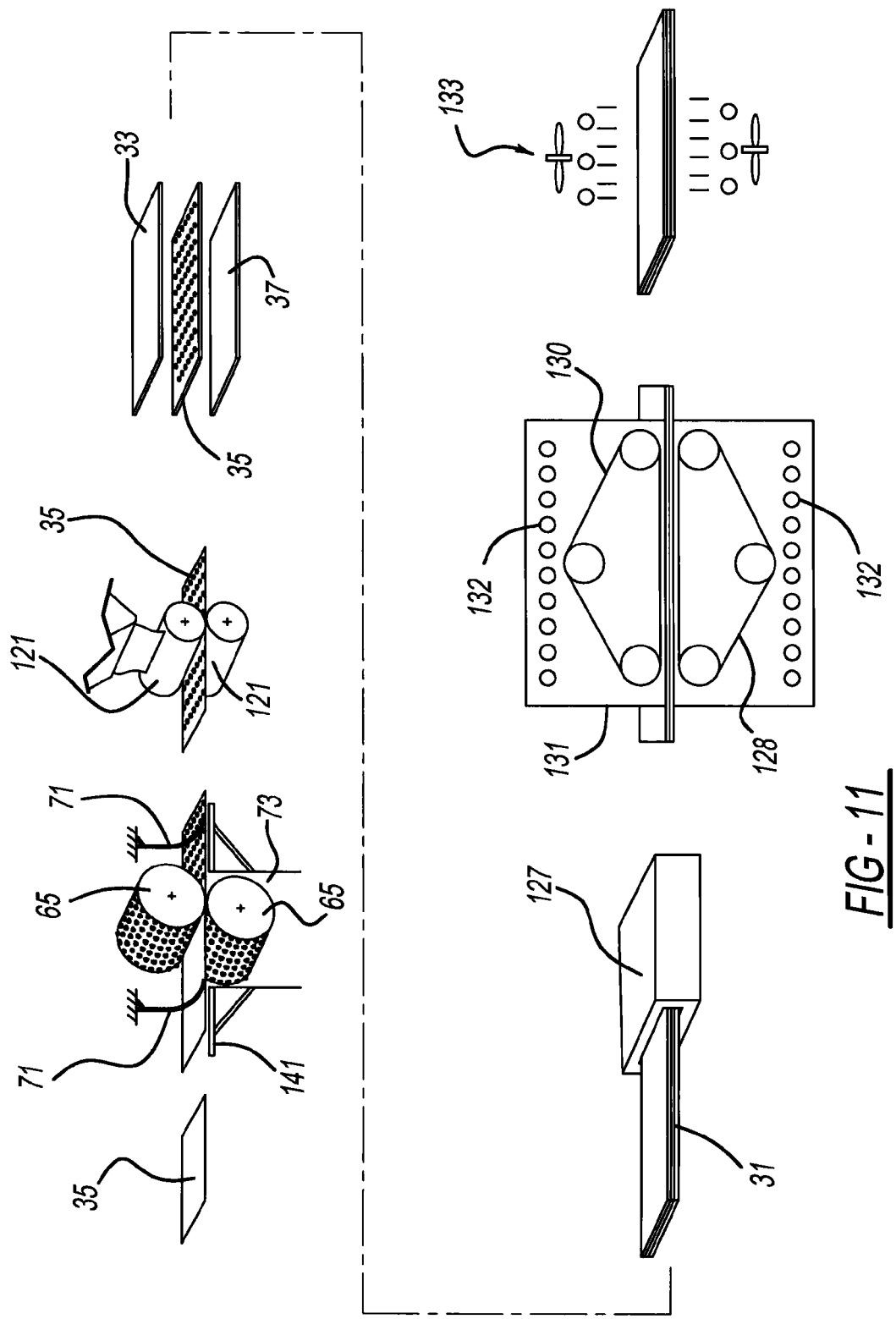
FIG. 11 is a diagrammatic showing a second embodiment manufacturing process for creating the sandwich structure.

FIG. 11 shows a different processing configuration used for pre-cut blanks or sheets. In this version, the pre-cut core sheet 35 is manually or automatically machine fed into forming or embossing rollers 65 via a table or shelf 141 projecting in the feeding direction from an embossing machine housing 73. Such a shelf or table arrangement can be used instead of or in addition to roller or belt conveyors 129, as illustrated in FIG. 6. FIG. 11 further shows a pair of pressure arms 71 upstream and downstream of embossing rollers 75.

Thereafter, the formed core sheet 35 is adhesively coated by coating rollers 121. Core sheet 35 is then manually or automatically stacked between the pre-cut outer layer sheets 33 and 37. The sandwiched sheets are subsequently fed into pre-heating oven 127, and the sandwich is then elevated in temperature while being laminated or compressed between laminating belts 128 and 130 to cause sufficient bonding therebetween, as discussed for FIG. 6A. These laminated sheets are then optionally cooled by the cooling unit 133 and then packaged. Various fixtures or pins may be employed to properly align the sheets when they are stacked together and laminated.

Another feature of the present sandwich structure 31 can be observed in FIGS. 12A-12D. In this configuration, outer sheet 33 has a peripheral segment 201 formed or bent into an offset L-shaped flange 203 which mates against an extending flange segment 205 of opposite face sheet 37. Adhesive 123 bonds together flanges 203 and 205 without core 35 being located therebetween. Thus, during the manufacturing, the core sheet is intentionally cut short of the peripheral edge and flange segments of the adjacent outer face sheets prior to stacking and laminating. Attaching flanges 203 and 205 can be provided on one or all peripheral edges of sandwich 31 depending upon the end use desired. It is alternately envisioned that both outer face sheets may also be bent in the offset manner shown with regard to face sheet 33, depending upon the desired location of the final sandwich flange relative to a component attached thereto.

FIGS. 13A and 13B illustrate another variation where flanges 203 and 205 are created in outer face sheets 33 and 37, respectively, and without core sheet 35 between the flanges. In this version, however, a hemming tool folds flanges 203 and 205 upon themselves in a generally U-shaped manner and interlocks them together to create a hemmed joint or seam around a peripheral portion thereof; adhesive may not be necessary between the flanges in such an arrangement.

Figure 26:
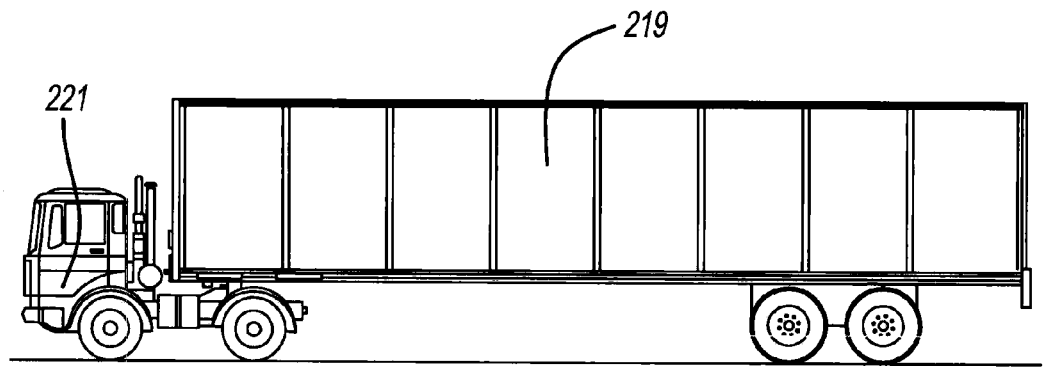
FIG. 26 is a side elevational view showing a truck and trailer employing the sandwich structure.
Figure 27:
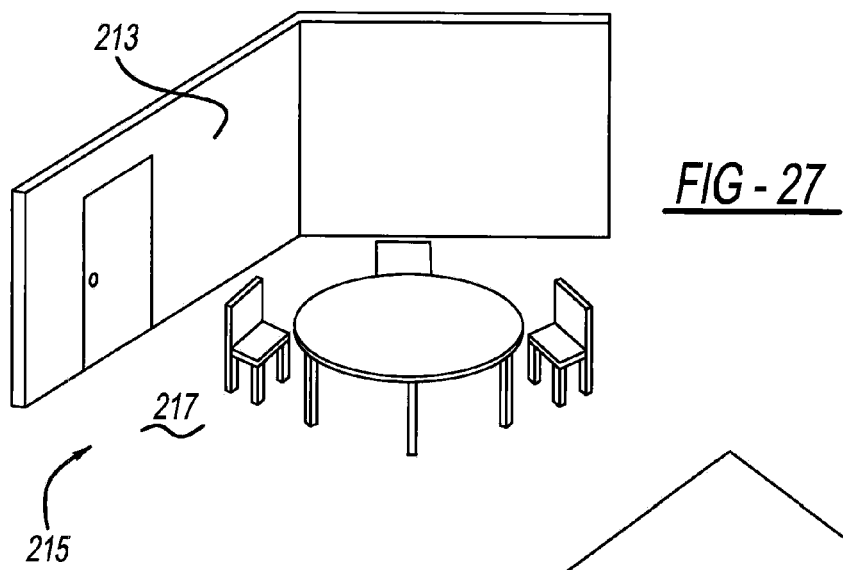
FIG. 27 is a perspective view showing a building wall and floor employing the sandwich structure.

As can be observed in 14A and 14B, yet another variation of a sandwich 31 includes outer face sheets 33 and 37 sandwiching a formed core sheet 35 therebetween, bonded by adhesive 123 or the like. Adhesive 123, but not core sheet 35, is present at flanges 203 and 205. In this construction, peripheral flanges 203 and 205 of the face sheets are angularly offset and upturned. This creates a generally U-shaped and open hook-like configuration. Thus, a pair of oppositely oriented hook-like flanges 203 and 205 provide a tongue-and-groove interlocking joint 211 between mating sandwich structures 31. This advantageously allows for removability of adjacent panels which is ideally suited for use as a wall structure or partition 213 in an office, residential or industrial building 215 (see FIG. 27). If adhesive is employed between the tongue-and-groove joints 211 then both mechanical and adhesive connections are provided between the adjacent sandwich structures 31 for permanent attachment together such as for a ceiling or floor 217 in building 215 (see FIG. 27), side, ceiling or floor walls for a vehicular trailer 219 (see FIG. 26), or body panels 221 in a land, water or air vehicle 221 (see FIG. 26).

Figure 17:
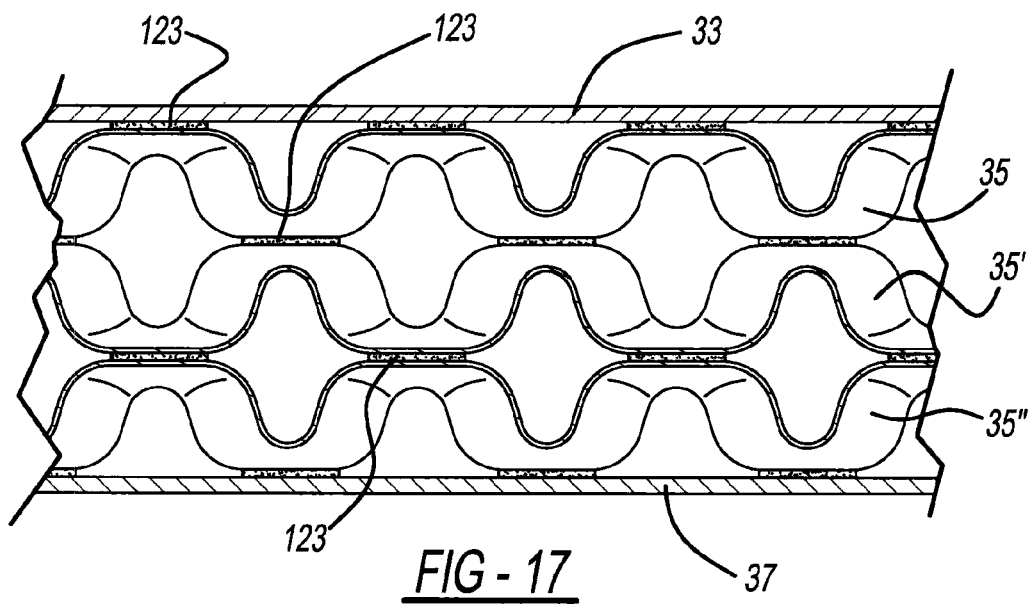
FIG. 17 is a cross-sectional view showing another configuration of a stacked core sandwich structure.

Referring now to FIGS. 16 and 17, multiple core sheets, each having formed peaks and valleys, are employed between outer face sheets 33 and 37. In FIG. 16, the peaks and valleys of each core 35, 35' and 35" are generally aligned with each other in both roll and cross-roll directions. Intermediate flat sheets 231 and 233 are positioned between the stacked core sheets 35, 35' and 35" with adhesive 123 bonding between the adjacent sheets. The FIG. 17 version only uses outer face sheets 33 and 37 without intermediate sheets between the adjacent touching core sheets 35, 35' and 35". But in this construction, the peaks and valleys of each adjacent core sheet must be offset from the other adjacent sheet so that a land on a peak of one is adhered by adhesive 123 to a land on the valley of the other, and so on. It should be appreciated that least three formed core layers are employed between a pair of outer generally flat face sheets, such that four, five or more cores can be stacked therebetween depending upon the compressive strength and thickness desired.

Figure 18A:
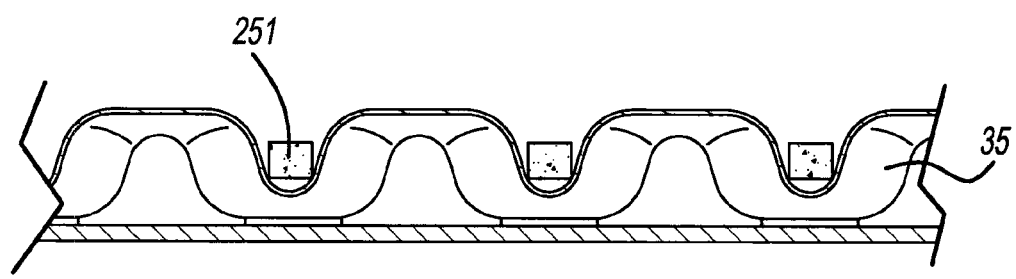
FIGS. 18A and 18B are a series of cross-sectional views showing foam employed in a sandwich structure.
Figure 18B:
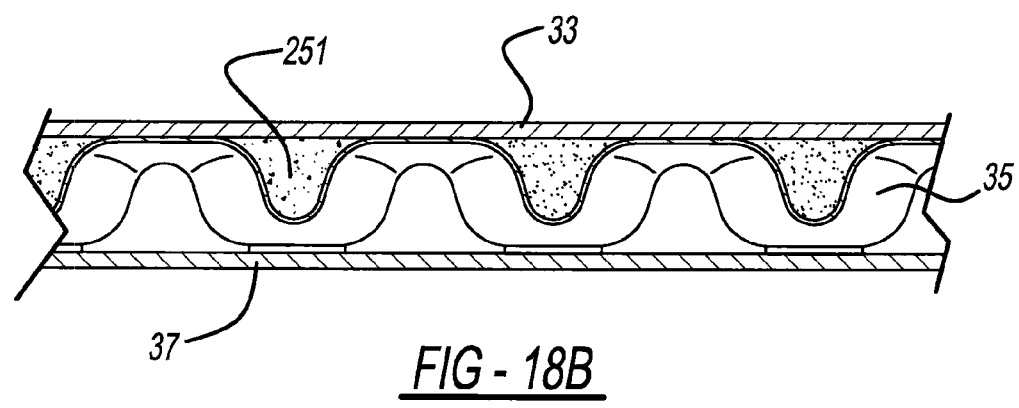

FIGS. 18A and 18B show a pelletized or granulated, substantially solid form of a foam 251 located in each valley of core sheet 35 prior to lamination of an outer face sheet 33 thereon. Foam 251 is preferably either an expandable structural foam or an expandable insulating foam, which also serves to adhere core sheet 35 to outer sheet 33 instead of requiring a separate adhesive coating station. Exemplary structural and insulating foam materials can be found in U.S. Pat. No. 6,846,559 entitled "Activatable Material" which issued to Czaplicki et al. on Jan. 25, 2005, and U.S. Pat. No. 3,950,259 entitled "Pourable Granulated Siliceous Insulation" which issued to Pallo et al. on Apr. 13, 1976, both of which are incorporated by reference herein.

Figure 19:
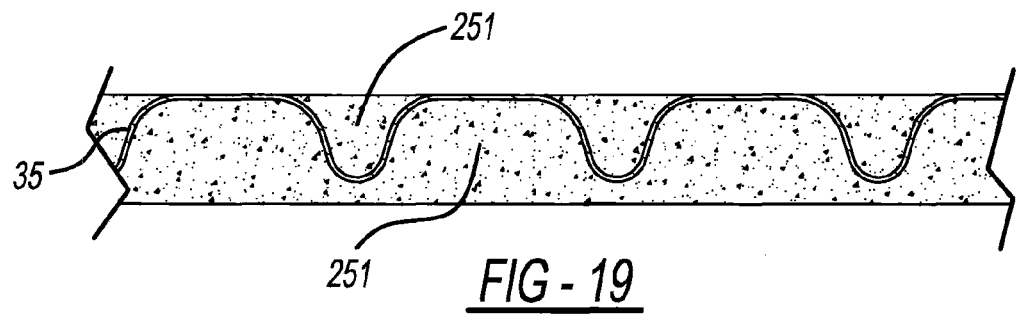
FIG. 19 is a cross-sectional view showing a variation of a foam-filled sandwich structure.

FIG. 19 illustrates a version with expandable foam located on both sides of metallic core sheet 35. In this version, the foam may be injected into the finished sandwich or molded onto both sides of core sheet prior to placement of the outer face sheets thereon.

Figure 20:
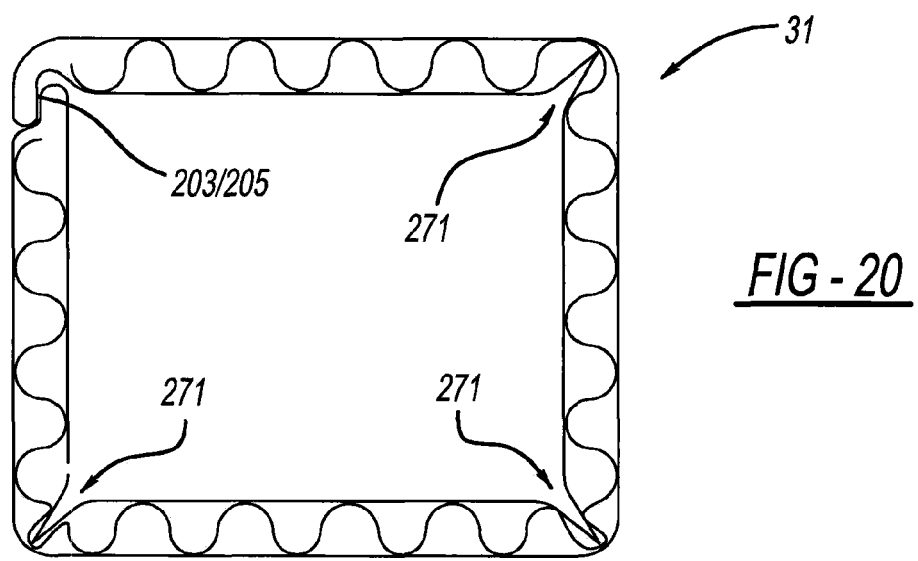
FIG. 20 is a cross-sectional view showing a folded configuration of a sandwich structure.
Figure 21:
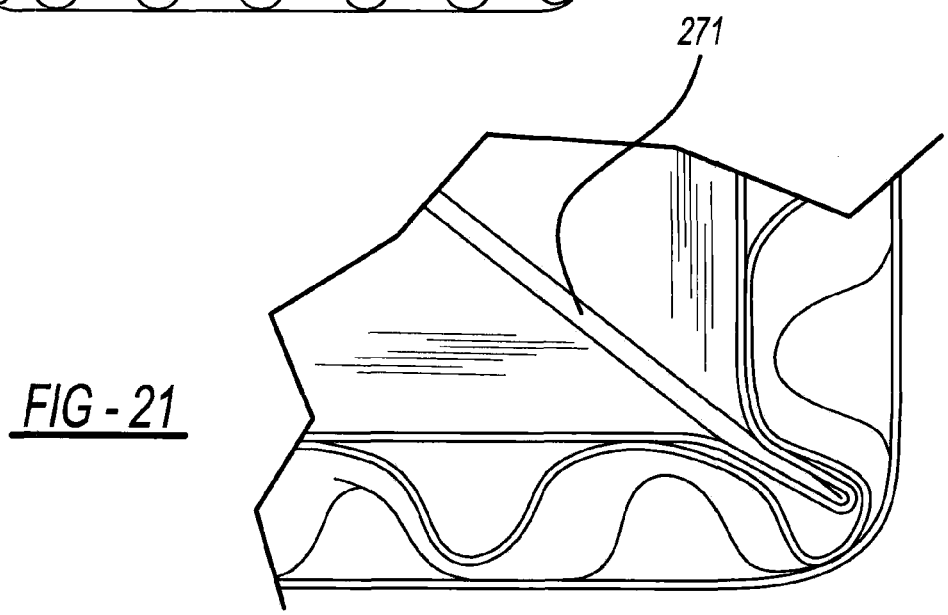
FIG. 21 is an enlarged fragmentary view showing a corner of the folded configuration of the sandwich structure of FIG. 20.

FIGS. 20 and 21 illustrate sandwich structure 31 folded at three corners such that each crease 271 created thereby is elongated in alignment with a series of aligned depressions 47 (see FIGS. 3 and 4A) in order to maximize the flexibility in this direction. This also minimizes structural degradation of the peaks and valleys adjacent to each side of crease 271. Sandwich structure 31 can be bent in this manner on a simple bending press, such that a pair of adjacent walls have a generally perpendicular relative orientation about the apex at crease 271. One or more bends can thereby be created in a single part. For example, the part of FIG. 20 illustrates an enclosed box section having a generally polygonal or square exterior shape. Moreover, one or more mating flanges 203/205 may be provided at the adjacent peripheral ends for adhesive, welding, spot welding, riveting, screwing or other fastening.

Figure 22:
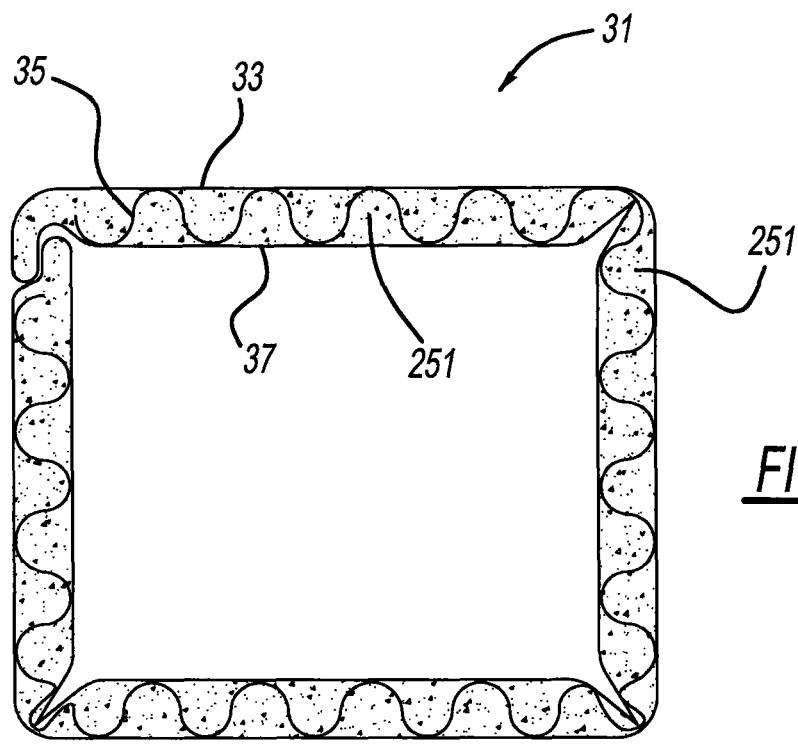
FIG. 22 is a cross-sectional view showing a foam-filled variation of the folded sandwich structure of FIG. 20.
Figure 23:
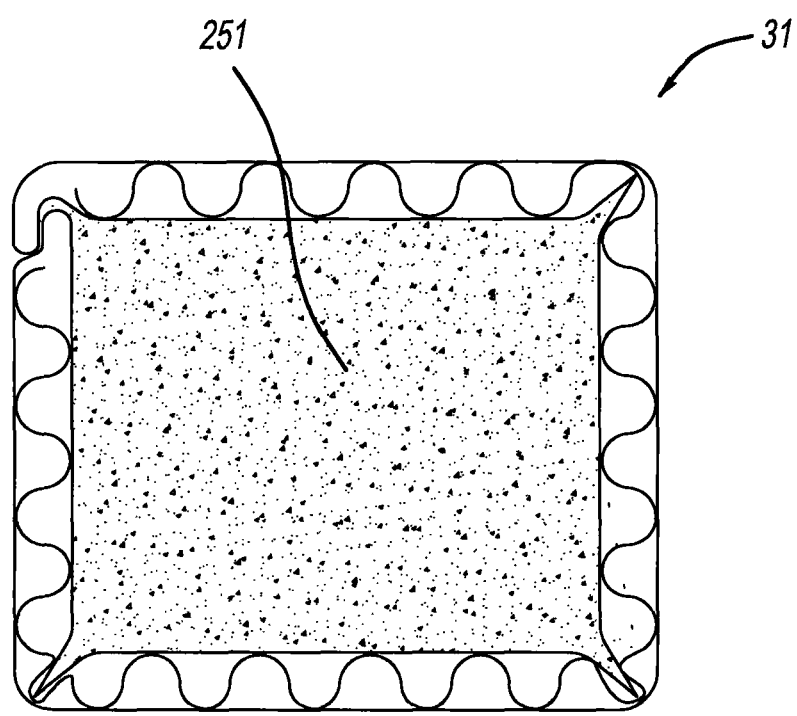
FIG. 23 is a cross-sectional view showing a different foam-filled configuration of the folded sandwich structure of FIG. 20.

FIG. 22 shows a folded box-like construction of sandwich 31. In this construction, however, an expandable foam 251 is located between outer face sheets 33 and 37 so as to encapsulate both sides of core sheet 35. In contrast, FIG. 23 shows an expandable foam 251 entirely filling the center and closed area defined by sandwich 31. If a structural foam 251 is employed then this foam and sandwich arrangement is ideally suited for light weight and extremely stiff structural pillars and trusses within a building, upstanding corner framing in a trailer, struts in an aircraft or the like.

Figure 24:
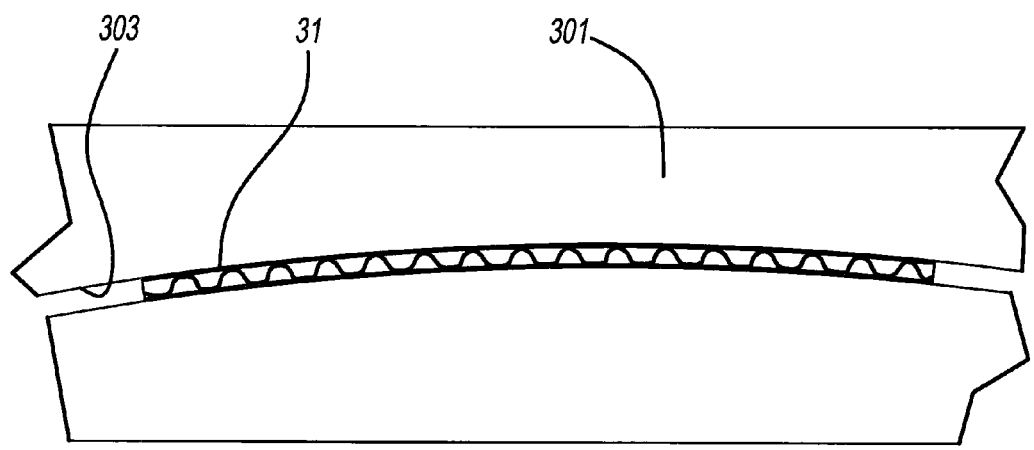
FIG. 24 shows a mold used to curve the sandwich structure of FIG. 15.
Figure 25:
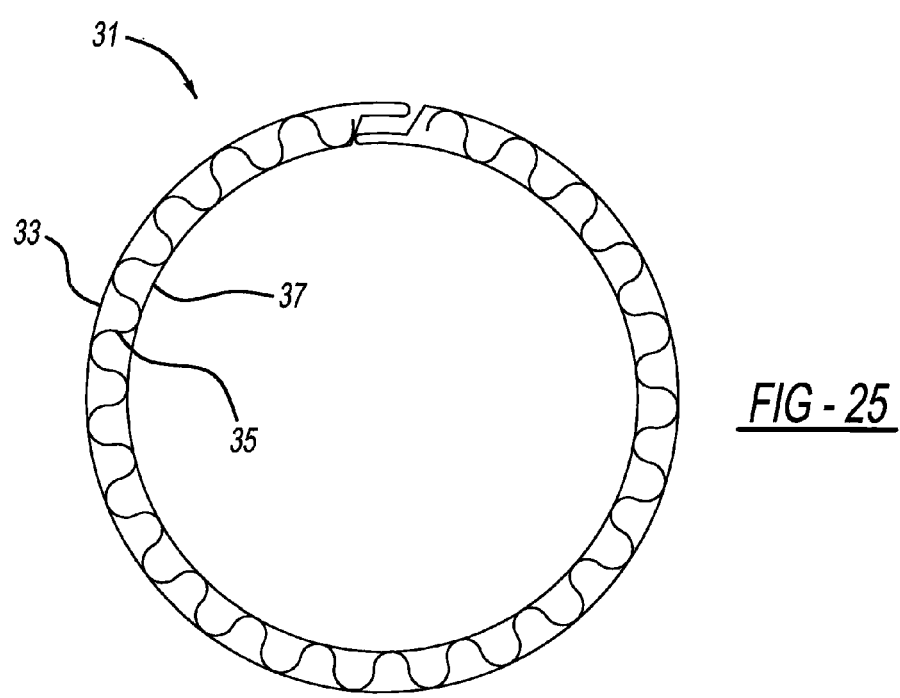
FIG. 25 shows a circular-cylindrical configuration of a sandwich structure.

Finally, a curved exterior shape can be created from sandwich structure 31, as is shown in FIGS. 15, 24 and 25. After lamination of outer face sheets 33 and 37 onto core sheet 35, a sandwich can be re-heated to about 302° F. for 15-30 minutes, by way of a non-limiting example, in order to melt the adhesive therebetween. The heated sandwich is then placed into a mold 301 having arcuately shaped and matching interior cavity faces 303, where moderate pressure is applied. Gradually, each sheet will move and slide relative to the others until the desired curved formation is obtained and then the adhesive is allowed to re-cool and set back up in a strongly bonded manner. This can provide either a gentle arcuately curved arrangement as shown in FIGS. 15 and 24 or, taken to its extreme, a fully circular-cylindrical arrangement with mating edge flanges, such as that shown in FIG. 25.

Figure 28:
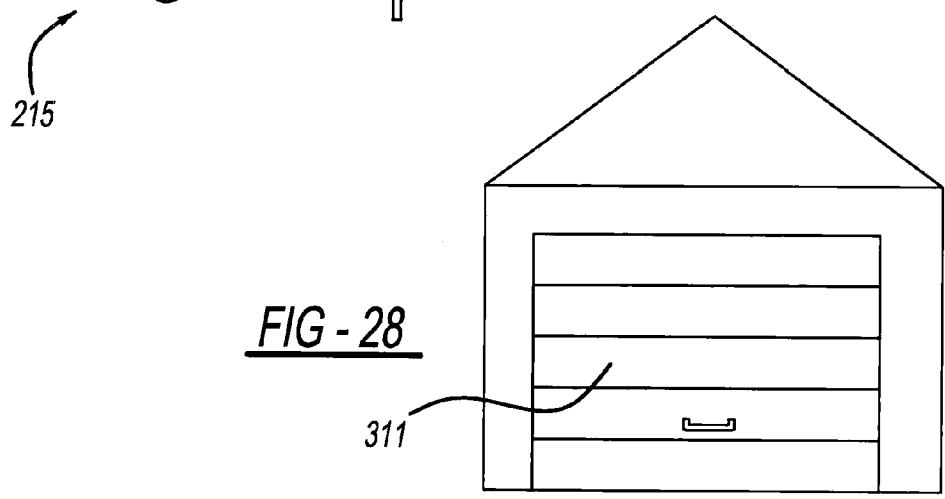
FIG. 28 is a true elevational view showing a movable garage door employing the sandwich structure.

FIG. 28 shows another variation wherein any of the previously disclosed sandwich constructions is employed as one or more sections of a door 311, such as a movable garage door with multiples of adjacent sandwich panels hinged together. The sandwich may alternately be a smaller building door like that shown in FIG. 27 or a door for trailer 219 in FIG. 26. It should also be appreciated that any of the preceding embodiments and features thereof can be mixed and matched with any of the others depending upon the final product and processing characteristics desired.

While various embodiments of the present invention have been disclosed, it should also be appreciated that other variations may be employed. For example, welding, spot welding or blind riveting may be used instead of adhesive bonding between the adjacent sheets, but many of the present weight, cost and quick assembly advantages may not be realized. Additionally, other dimensions and shapes may be provided for the core sheet, embossing pins and the like, however, many of the manufacturing advantages and property strengths will not be achieved. Variations are not to be regarded as a departure from the present disclosure, and all such modifications are intended to be included within the scope and spirit of the present invention.

The invention claimed is:

1. A sandwich structure comprising;
   (a) a metallic core sheet including alternating peaks and valleys with raised ridges bridging between adjacent peaks along a first direction but not along a perpendicular second direction, the peaks including substantially flat lands at tops thereof;
   (b) the core sheet exhibiting a different mechanical flexibility along the first direction versus the second direction, the core sheet being more flexible when torque is applied with the first direction as a rotational axes versus the second direction as the rotational axes;
   (c) at least a pair of outer face sheets between which the core sheet is located;
   (d) a peripheral section of at least one of the face sheets including an offset flange with a distal end angularly facing substantially perpendicularly away from the associated face sheet from which it is bent;
   (e) the flange extending at least a majority of a nominal thickness distance between the outer face sheets;
   (f) a peripheral edge of a mating sandwich panel contacting against the flange; and (g) at least one of the valleys having a round true view shape centrally located between an adjacent four of the peaks which also each have a round true view shape.

2. The sandwich structure of claim 1, wherein out-of-plane shear stiffness of the core sheet is at least 1.3 times greater in the first direction as compared to the second direction.

3. The sandwich structure of claim 1, wherein out-of-plane shear strength of the core sheet is at least 1.05 times greater in the first direction as compared to the second direction.

4. The sandwich structure of claim 1, wherein a length shrinkage factor of the core sheet, where a ratio of the initial versus end formed length is at least 1.08 along the second direction, is greater than the shrinkage factor along the first direction.

5. The sandwich structure of claim 1, wherein the second direction is a manufacturing feed direction of the core sheet while the first direction is a cross-feeding direction, the outer face sheets are metal, and there is an air gap between the bent flange at the distal end, which is flat, and an outermost portion of the core sheet.

6. The sandwich structure of claim 1, further comprising:
adhesive bonding the core sheet to the outer face sheets;
at least one of the face sheets being metallic;
the core sheet being free of a lubricant during formation of the peaks and valleys; and
the forming being performed at an ambient room temperature with embossing rolls.

7. The sandwich structure of claim 1, wherein the outer face sheet has a permanently curved orientation in one of the directions but not the other to define at least part of a circular-cylindrical arc with four peripheral edges surrounding the outer face sheet.

8. The sandwich structure of claim 1, further comprising at least one additional metallic core sheet having alternating peaks and valleys therein, the additional core sheet being attached to a third substantially flat face sheet on one side and one of the pair of the outer face sheets on a side opposite the one side, the core sheets being stacked upon each other with the third flat face sheet therebetween.

9. The sandwich structure of claim 1, further comprising an expandable structural foam located between the core sheet and at least one of the outer face sheets to add compressive strength to the outer face sheets.

10. The sandwich structure of claim 1, further comprising an expandable insulating foam located between the core sheet and at least one of the outer face sheets.

11. The sandwich structure of claim 1, wherein the peripheral section defining the attachment flange has a hook-like shape.

12. The sandwich structure of claim 1, wherein the outer face sheets are folded along a crease elongated in a direction substantially parallel to that of the first direction without substantially reducing structural properties adjacent either side of the crease.

13. The sandwich structure of claim 1, wherein the outer face sheets and core are part of a load bearing floor or side vehicular trailer sandwich panel.

14. The sandwich structure of claim 1, wherein the outer face sheets and core are part of a building sandwich panel.

15. The sandwich structure of claim 1, wherein the outer face sheets and core are part of a movable door sandwich panel.

16. A sandwich structure comprising:
outer face sheets;
a metallic core sheet including alternating peaks and valleys, at least one of the valleys having a round true view shape centrally located between an adjacent four of the peaks which also have a round true view shape, the core sheet located between middle segments of the outer face sheets; and
an attachment flange being defined by peripheral segments of the outer face sheets joined and contacting together without the core sheet located therebetween, at least one of the outer face sheets being bent at the attachment flange;
the sheets being a vehicular trailer sandwich panel; and
the core sheet being more flexible in one direction versus the other due to selectively located ridges and depressions between certain adjacent of the peaks therein.

17. The sandwich structure of claim 16, further comprising adhesive located between the outer face sheets at the flange, the adhesive also bonding substantially flat outer lands of the peaks and valleys of the core sheet to adjacent surfaces of the outer face sheets, and all of the sheets being metallic.

18. The sandwich structure of claim 16, wherein only one of the outer face sheets has its peripheral segment deformed in an offset manner so that it is positioned adjacent to the opposite peripheral segment of the other face sheet at the flange, and the sheets are an elongated side wall or floor panel of a vehicular trailer.

19. The sandwich structure of claim 16, wherein the flange of the outer face sheets is hemmed together.

20. The sandwich structure of claim 16, wherein the flange has a hook-like bend such that its peripheral segment is oriented in an angularly offset manner from the enlarged planer direction of the outer face sheets, in order to create an interlocking tongue-and-groove formation with an adjacent mating sandwich of joined sheets.

21. The sandwich structure of claim 16, further comprising expandable foam located between and adhering the core sheet and at least one of the adjacent outer face sheets.

22. The sandwich structure of claim 16, wherein the combined outer face and core sheets have an arcuate exterior shape surrounded by four peripheral edges.

23. The sandwich structure of claim 16, wherein the core and outer face sheets are all metallic and have a sharply angled and substantially perpendicular fold therein.

24. The sandwich structure of claim 16, wherein the peripheral segments of the attachment flange are hemmed together, with the flange otherwise being flat.

25. The sandwich structure of claim 16, wherein a periphery of the core sheet is inwardly spaced from the flange.

26. The sandwich structure of claim 16, wherein out-of-plane shear stiffness of the core sheet is at least 1.3 times greater in a first direction as compared to a second direction.

27. The sandwich structure of claim 16, wherein out-of-plane shear strength of the core sheet is at least 1.05 times greater in a first direction as compared to a second direction.

28. The sandwich structure of claim 16, wherein a length shrinkage factor of the core sheet, where a ratio of the initial versus end formed length is at least 1.08 along a second direction, is greater than the shrinkage factor along a first direction.

29. The sandwich structure of claim 16, further comprising:
adhesive bonding the core sheet to the outer face sheets;
at least one of the face sheets being metallic;
the core sheet being free of a lubricant during formation of the peaks and valleys; and the formation of the peaks and valleys being performed at an ambient room temperature with embossing rolls.

30. A sandwich structure comprising:

at least two substantially flat sheets;

at least two core sheets, each having alternating peaks and valleys therein, the peaks including curved side walls ending in substantially flat outer land surfaces each having a circular true view shape;

the core sheets being in a stacked relationship to each other and the substantially flat sheets being attached to the outer land surfaces of at least one of the core sheets;

a single intermediate substantially flat sheet located between the adjacent core sheets, where all of the sheets are metallic;

expandable foam located between at least one of the core sheets and an adjacent of the flat sheets;

a foam-free space being located between valleys of at least one of the core sheets and an adjacently facing of the flat sheets;

elevated ridges bridging between adjacent peaks of the core sheets in a first direction but not in a perpendicular second direction, thereby allowing greater flexing of the core sheet about an axis parallel to the first direction as compared to the second direction; and the substantially flat sheets and the core sheets being part of a vehicular trailer sandwich panel.

31. The sandwich structure of claim 30, wherein the stacked peaks and valleys of the core sheets are substantially aligned with each other with adhesive between the outer land surfaces and the adjacent flat sheets.

32. A sandwich structure comprising:

(a) a metallic core sheet including alternating peaks and valleys with raised ridges bridging between adjacent peaks along a first direction but not along a perpendicular second direction, the peaks including substantially flat lands at tops thereof;

(b) the core sheet exhibiting a different mechanical flexibility along the first direction versus the second direction;

(c) at least a pair of outer face sheets between which the core sheet is located;

(d) a peripheral section of at least one of the face sheets including an offset flange with a distal end angularly facing substantially perpendicularly away from the associated face sheet from which it is bent;

(e) the flange extending at least a majority of a nominal thicknes distance between the outer face sheets;

(f) a peripheral edge of a mating sandwich panel contacting against the flange;

(g) an expandable insulating foam located between the core skeet and at least one of the outer face sheets; and (h) a periphery of the core sheet being inwardly spaced from the flange.

33. The sandwich structure of claim 32, wherein the sheets are a vehicular trailer side wall, door or floor sandwich panel.

34. The sandwich structure of claim 32, wherein a sandwich of the attached foam and sheets has an arcuate exterior shape.

35. The sandwich structure of claim 32, wherein a sandwich of the attached foam and sheets has a substantially perpendicularly bent exterior shape.

36. The sandwich structure of claim 32, wherein the foam is only on a single side of the core sheet.

37. The sandwich structure of claim 32, wherein the foam is in valleys of both sides of the core sheet.

38. The sandwich structure of claim 32, wherein a shrinkage factor is greater in a manufacturing length feed direction of the core than in a cross-feeding direction of the core, and an out-of-plane shear stiffness is greater in the cross-feeding direction than in the manufacturing length feed direction.

39. The sandwich structure of claim 32, wherein out-of-plane shear stiffness of the core sheet is at least 1.3 times greater in the first direction as compared to the second direction.

40. The sandwich structure of claim 32, wherein out-of-plane shear strength of the core sheet is at least 1.05 times greater in the first direction as compared to the second direction.

41. The sandwich structure of claim 32, further comprising:

adhesive bonding the core sheet to the outer face sheets;

at least one of the face sheets being metallic;

the core sheet being free of a lubricant during formation of the peaks and valleys; and the formation of the peaks and valleys being performed at an ambient room temperature with embossing rolls.

42. The sandwich structure of claim 32, wherein the outer face sheets and the core sheet are part of a load bearing floor or side vehicular trailer sandwich panel.

43. The sandwich structure of claim 32, wherein the outer face sheets and the core sheet are part of a building sandwich panel.

* * * * *